(12) United States Patent
Yan et al.

(10) Patent No.: US 11,498,202 B2
(45) Date of Patent: Nov. 15, 2022

(54) CASTER MODULE AND ROBOT

(71) Applicants: CLOUDMINDS (BEIJING) TECHNOLOGIES CO., LTD., Beijing (CN); INNFOS DRIVE (BEIJING) TECHNOLOGIES CO., LTD., Beijing (CN)

(72) Inventors: Xunge Yan, Beijing (CN); Haotian Cui, Beijing (CN); Cheng Luo, Guangxi (CN); William Xiao-qing Huang, Beijing (CN)

(73) Assignees: CLOUDMINDS (BEIJING) TECHNOLOGIES CO., LTD., Beijing (CN); CLOUDMINDS ROBOTICS CO., LTD., Shanghai (CN)

( * ) Notice: Subject to any disclaimer, the term of this patent is extended or adjusted under 35 U.S.C. 154(b) by 326 days.

(21) Appl. No.: 16/806,740

(22) Filed: Mar. 2, 2020

(65) Prior Publication Data
US 2020/0276697 A1 Sep. 3, 2020

(30) Foreign Application Priority Data
Mar. 1, 2019 (CN) .......................... 201920266830.7

(51) Int. Cl.
*B60B 19/00* (2006.01)
*B25J 5/00* (2006.01)
*B25J 9/10* (2006.01)

(52) U.S. Cl.
CPC ............... *B25J 5/007* (2013.01); *B25J 9/108* (2013.01)

(58) Field of Classification Search
CPC .......... B60B 19/003; B25J 5/007; B25J 9/108
See application file for complete search history.

(56) References Cited

U.S. PATENT DOCUMENTS

| 6,315,109 B1 * | 11/2001 | Dean .......................... B60P 1/52 |
| | | 198/786 |
| 2012/0061156 A1 | 3/2012 | Takenaka |
| 2014/0232174 A1 | 8/2014 | Zdrahal et al. |
| 2015/0129327 A1 | 5/2015 | Yoshino et al. |
| 2018/0236813 A1 | 8/2018 | Ochiai et al. |
| 2018/0361784 A1 | 12/2018 | Zapf |
| 2019/0126675 A1 * | 5/2019 | Zhang .................. B60B 19/003 |

FOREIGN PATENT DOCUMENTS

| CN | 105730216 A | | 7/2016 |
| CN | 107105950 A | | 8/2017 |
| JP | 2007022342 A | * | 2/2007 |
| JP | 2007022342 A | | 2/2007 |
| JP | 2014526419 A | | 10/2014 |
| JP | 3217560 U | | 8/2018 |
| JP | 2018134917 A | | 8/2018 |

OTHER PUBLICATIONS

European Search Report dated May 19, 2020; EP20159686.3
1st Office Action dated Dec. 1, 2020 by the JP Office; JP 2020-032061.

* cited by examiner

*Primary Examiner* — Randell J Krug

(57) ABSTRACT

A caster module includes: an omni wheel, provided with an shaft groove; and an effector, received in the shaft groove, a case of the effector being rotatable relative to an inner wall of the shaft groove, and an output end of the effector being connected to the omni wheel and configured to drive the omni wheel to rotate.

14 Claims, 6 Drawing Sheets

CASTER MODULE AND ROBOT

CROSS-REFERENCE TO RELATED APPLICATIONS

This application claims priority to Chinese Patent Application No. 201920266830.7, filed with the Chinese Patent Office on Mar. 1, 2019, titled "CASTER MODULE AND ROBOT", the entire contents of which are incorporated herein by reference.

TECHNICAL FIELD

Embodiments of the present application relate to the technical field of robots, and in particular, relate to a caster module and a robot.

BACKGROUND

An omni wheel is a wheel implementing omni-directional movements. In a movement platform built by using the omni wheels, by controlling rotation of the omni wheels, advance, retract or steering of the movement platform may be implemented. When a caster module of a robot employs omni wheels as rolling wheels, the robot may move towards different directions by rotation of the omni wheels.

During practice of the present application, the inventors have identified that: at present, in the caster module of the robot, an omni wheel and an effector are separately disposed, and the omni wheel is connected to the effector by a rotation shaft.

SUMMARY

An embodiment of the present application provides a caster module. The caster module includes an omni wheel, provided with an shaft groove; and an effector, received in the shaft groove, wherein a case of the effector is rotatable relative to an inner wall of the shaft groove, and an output end of the effector is connected to the omni wheel and configured to drive the omni wheel to rotate.

Another embodiment of the present application provides a robot. The robot includes the caster module manipulator as described above.

BRIEF DESCRIPTION OF THE DRAWINGS

For clearer descriptions of the technical solutions according to the specific embodiments of the present application or the technical solutions in the related art, the accompanying drawings incorporated for illustrating the specific embodiments or the related art are briefly described hereinafter. In all the accompanying drawings, like elements or parts are generally denoted by like reference numerals. In the accompanying drawings, various elements or parts are not necessarily drawn according to the actual scale.

REFERENCE NUMERALS AND DENOTATIONS THEREOF

Figure 1:
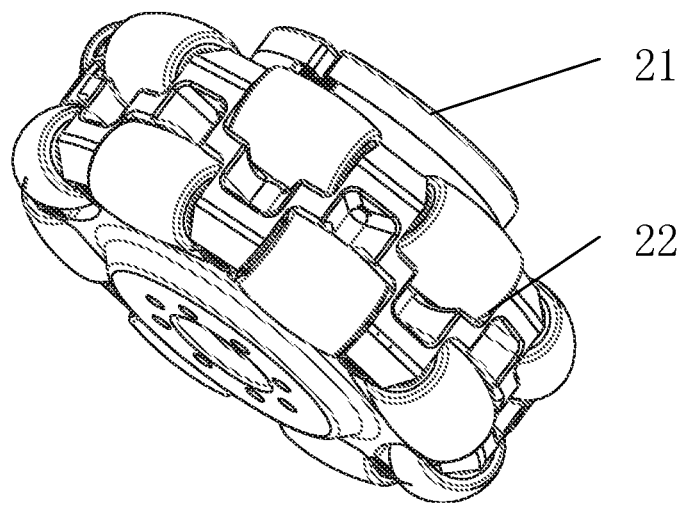
FIG. 1 is a schematic view of a caster module according to an embodiment of the present application.

Caster module 20;
Effector 21;
Omni wheel 22;
First bearing 23;
Inner-side hub 221;
Omni wheel primary structure 222;
Outer-side hub 223;
Inner-side roller 224;
Outer-side roller 225;
Second bearing 226;
Third bearing 227;
Outer shaft pin 228;
Inner shaft pin 229;
Inner through hole 2241;
Outer through hole 2251;
Omni wheel primary structure body 2221;
First outer boss 2222;
First inner boss 2223;
Shaft groove 2221a;
First outer groove 2222a;
First inner groove 2223a;
Inner-side hub body 2211;
Second inner boss 2212;
Connecting through hole 2211a;
Second inner groove 2212a;
Inner rotation groove 221a;
Second outer boss 2232;
Outer-side hub body 2231;
Second outer groove 2232a;
Outer rotation groove 223a;
Inner gasket 2210;
Outer gasket 220;
Flange 221.

DETAILED DESCRIPTION

The embodiments containing the technical solutions of the present application are described in detail with reference to the accompanying drawings. The embodiments hereinafter are only used to clearly describe the technical solutions of the present application. Therefore, these embodiments are only used as examples, but are not intended to limit the protection scope of the present application.

It should be noted that unless otherwise specified, the technical terms and scientific terms used in the present application shall express general meanings that may be understood by a person skilled in the art.

In the description of some embodiments of the present invention, it should be understood that the terms "central", "longitudinal", "transversal", "length", "width", "thickness", "upper", "lower", "front", "rear", "left", "right", "vertical", "horizontal", "top", "bottom", "inner", "outer", "clockwise", "counterclockwise", "axial", "radial", "circumferential" and the like indicate orientations and position relationships which are based on the illustrations in the accompanying drawings, and these terms are merely for ease and brevity of the description, instead of indicating or implying that the devices or elements shall have a particular orientation and shall be structured and operated based on the particular orientation. Accordingly, these terms shall not be construed as limiting the present invention.

In addition, terms of "first", "second" are only used for description, but shall not be understood as indication or implication of relative importance or implicit indication of the number of the specific technical features. In the description of the present application, the term "more" or "a plurality of" signifies at least two, unless otherwise specified.

In the description of the present application, it should be noted that unless otherwise specified and defined, the terms "mounted", "coupled", "connected" and "fixed" and derivative forms thereof shall be understood in a broad sense, which, for example, may be understood as fixed connection, detachable connection or integral connection; may be understood as mechanical connection or electrical connection, or understood as direct connection, indirect connection via an intermediate medium, or communication between the interiors of two elements or interactions between two elements. Persons of ordinary skill in the art may understand the specific meanings of the above terms in the present disclosure according to the actual circumstances and contexts.

In the present application, unless otherwise specified or defined, by defining that a first feature is disposed "above" or "below" or "beneath" a second feature, it may be meant that the first feature is in direct contact with the second feature, or the first feature is in indirect contact with the second feature via an intermediate medium. In addition, by defining that a first feature is disposed "over" or "above" a second feature, it may be meant that the first feature is rightly over the second feature or is obliquely above the second feature, or the horizontal height of the first feature is greater than that of the second feature. In addition, by defining that a first feature is disposed "under" or "blow, or "beneath" a second feature, it may be meant that the first feature is rightly under the second feature or is obliquely below the second feature, or the horizontal height of the first feature is less than that of the second feature.

Figure 2:
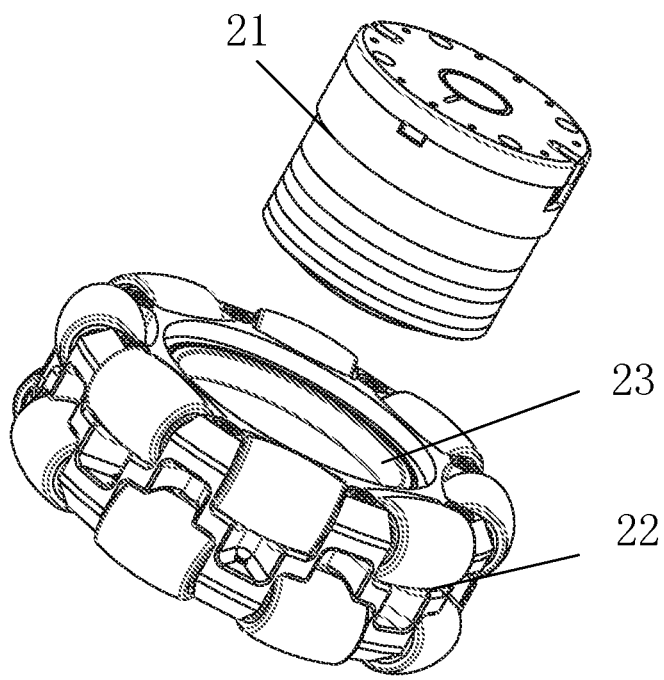
FIG. 2 is an exploded view of the caster module according to an embodiment of the present application.

Referring to FIG. 1 and FIG. 2, the caster module 20 includes an effector 21, an omni wheel 22, and a first bearing 23. The first bearing 23 is fixed to the omni wheel 22. The effector 21 is at least partially inserted into the omni wheel 22, a case of the effector 21 is sleeved onto the first bearing 23, and an output end of the effector 21 is connected to the omni wheel 22. When the effector 21 drives the output end thereof to rotate, the omni wheel 22 may also rotate relative to the case of the effector 21, such that the omni wheel 22 is driven to rotate, and hence functions of movement and steering of the caster module 20 are implemented.

Figure 3:
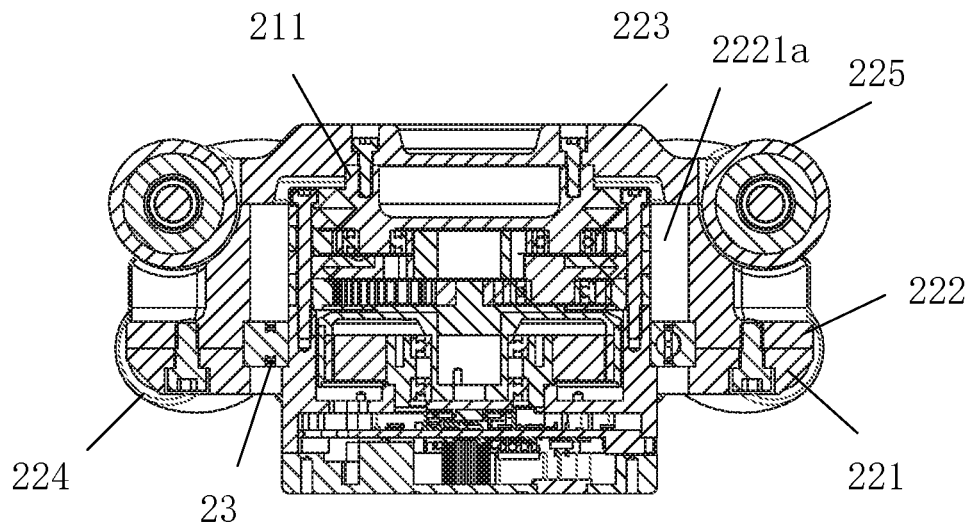
FIG. 3 is a sectional view of the caster module according to an embodiment of the present application.
Figure 4:
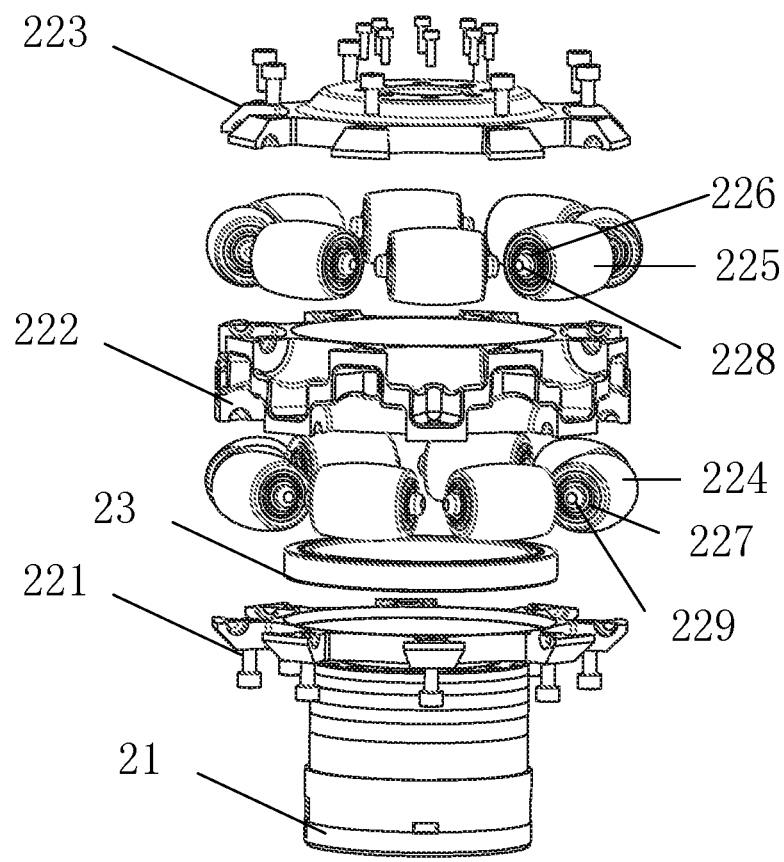
FIG. 4 is another exploded view of the caster module according to an embodiment of the present application.

With respect to the omni wheel 22, as illustrated in FIG. 3 to FIG. 4, the omni wheel 22 includes an inner-side hub 221, an omni wheel primary structure 22, an outer-side hub 223, a plurality of inner-side rollers 224, a plurality of outer-side rollers 225, a plurality of second bearings 226, a plurality of third bearings 227, a plurality of outer shaft pins 228, and a plurality of inner shaft pins 229.

Figure 5:
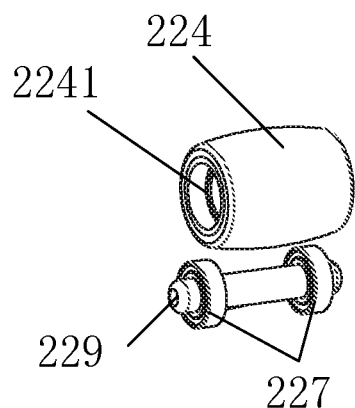
FIG. 5 is a schematic view of an inner-side roller in the caster module according to an embodiment of the present application.

With respect to the inner-side roller 224 and the inner shaft pin 229, as illustrated in FIG. 5, the inner-side roller 224 is provided with an inner through hole 2241. One third bearing 227 is fixed to the inner through hole 2241 of one inner-side roller 224. One inner shaft pin 229 is inserted into the inner through hole 2241, and sleeved onto the third bearing 227, such that the inner-side roller 224 may rotate about the inner shaft pin 229.

In some embodiments, each inner-side roller 224 may be provided with at least two third bearings 227. The two third bearings 227 are disposed at two ends of the through hole 2241 of the inner-side roller 224, and the inner shaft pin 229 is sleeved onto the two third bearings 227, such that the inner-side roller 224 may rotate more stably with less oscillation.

Figure 6:
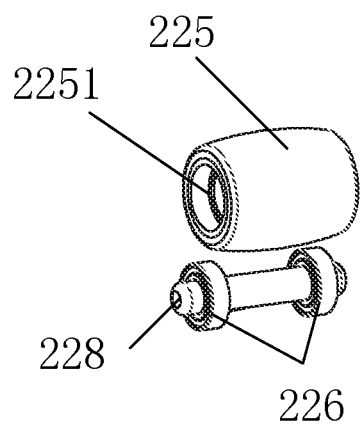
FIG. 6 is a schematic view of an outer-side roller in the caster module according to an embodiment of the present application.

With respect to the outer-side roller 225 and the outer shaft pin 228, as illustrated in FIG. 6, the outer-side roller 225 is provided with an outer through hole 2251. One second bearing 226 is fixed to the outer through hole 2251 of one outer-side roller 225. One outer shaft pin 228 is inserted into the outer through hole 2251, and sleeved onto the second bearing 226, such that the outer-side roller 225 may rotate about the outer shaft pin 228.

In some embodiments, each outer-side roller 225 may be provided with at least two second bearings 226. The two second bearings 226 are disposed at two ends of the outer through hole 2251 of the outer-side roller 225, and the outer shaft pin 228 is sleeved onto the two second bearings 227, such that the outer-side roller 225 may rotate more stably with less oscillation.

Figure 7:
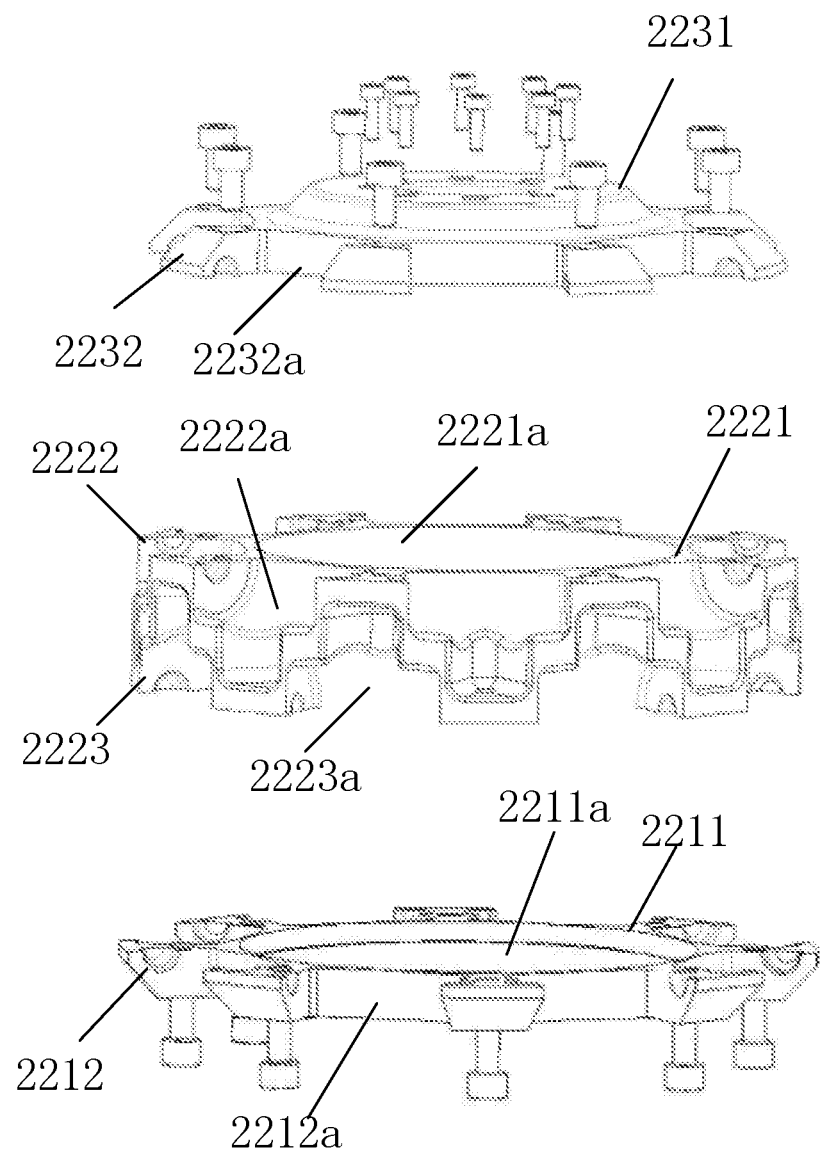
FIG. 7 is an exploded view of an omni wheel in the caster module according to an embodiment of the present application.
Figure 8:
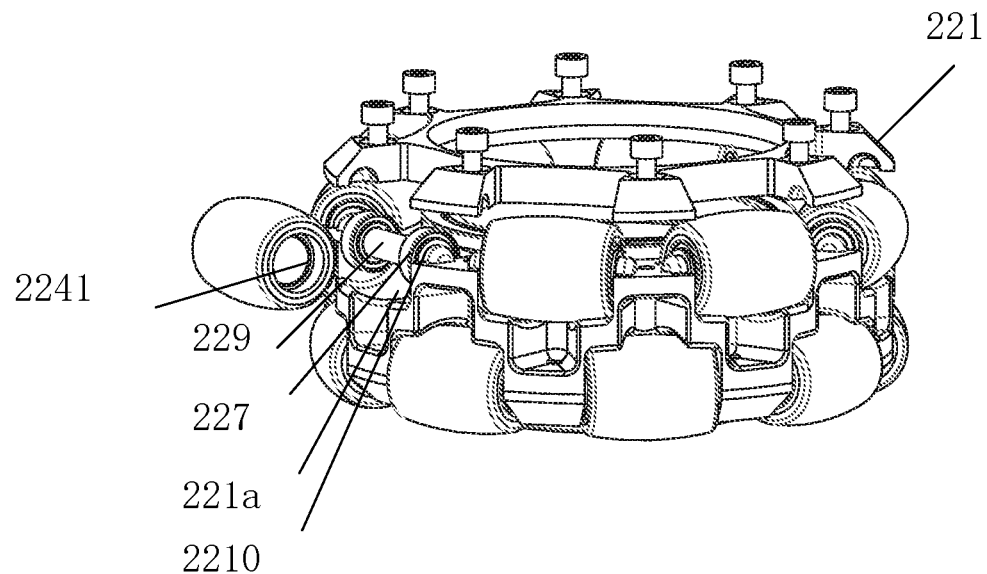
FIG. 8 is a schematic view of an inner-side hub and the omni wheel in the caster module according to an embodiment of the present application.
Figure 9:
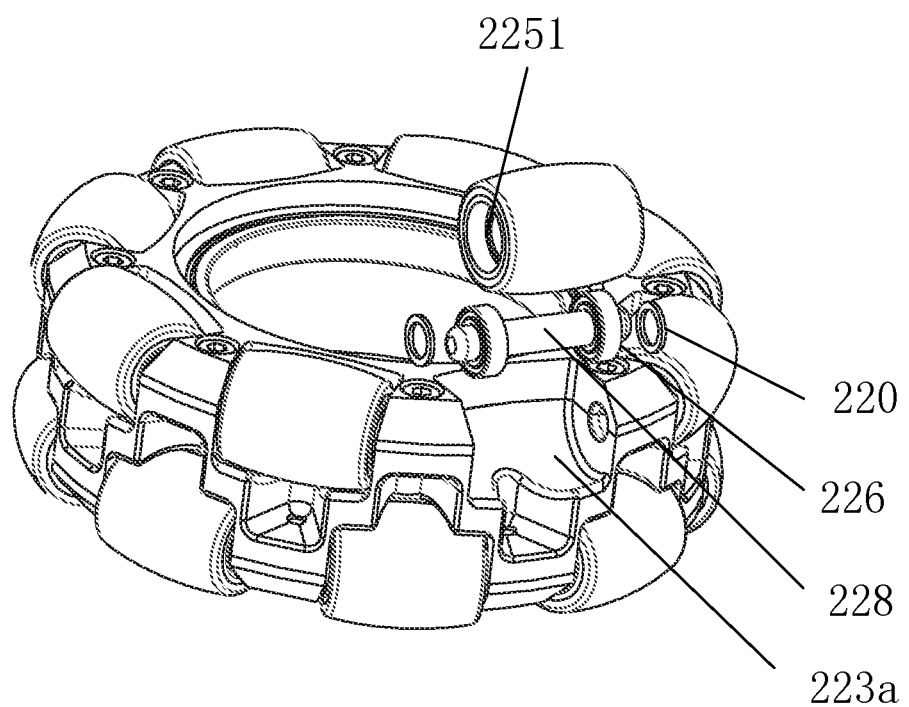
FIG. 9 is a schematic view of an omni wheel in the caster module according to an embodiment of the present application.

With respect to the omni wheel primary structure 222, as illustrated in FIG. 7 to FIG. 9, the omni wheel primary structure 222 includes an omni wheel primary structure body 2221 and a plurality of outer bosses 2222 and first inner bosses 2223 that are defined by extending from the omni wheel primary structure body 2221. The omni wheel primary structure 2221 is provided with an shaft groove 2221a, wherein the shaft groove 2221a is provided with an edge. An outer ring of the first bearing 23 is in an interference fit to the shaft groove 2221a, and abuts against the edge of the shaft groove 2221a, such that the first bearing 23 is fixed to the shaft groove 2221a. The plurality of first inner bosses 2223 are disposed around the omni wheel primary structure body 2221, and a first inner groove 2223a is defined between two adjacent first inner bosses 2223. The plurality of first outer bosses 2222 are disposed around the omni wheel primary structure body 2221, and a first outer groove 2222a is defined between two adjacent first outer bosses 2222.

It may be understood that in some other embodiments, the first bearing 23 may be connected to the shaft groove 2221a in other fashions other than the above described fashion. For example, the first bearing 23 may be connected to the shaft groove 2221a by key connection or pin connection.

With respect to the inner-side hub 221, as illustrated in FIG. 7 to FIG. 9, the inner-side hub 221 includes an inner-side hub body 2211 and a plurality of second inner bosses 2212 that are defined by extending from the inner-side hub body 2211. The inner-side hub body 2211 is provided with a connecting through hole 2211a. The plurality of second inner bosses 2212 are disposed around the inner-side hub body 2211, and a second inner groove 2212a is defined between two adjacent second inner bosses 2212. The number of first inner bosses 2223 is the same as the number of second inner bosses 2212, and one first inner boss 2223 is threaded to one second inner boss 2212, such that the inner-side hub 221 is connected to the omni wheel primary structure 222. In addition, when the first inner boss 2223 is threaded to the second inner boss 2212, the connecting through hole 2211*a* is in communication with the shaft groove 2221*a*, and one first inner groove 2223*a* is in communication with one second inner groove 2212*a*, such that an inner rotation groove 221*a* is collaboratively defined. One inner shaft pin 229 is disposed in one inner rotation groove 221*a*, and two ends of the inner shaft pin 229 are fixed to two opposing side walls of the inner rotation groove 221*a*, such that one inner-side roller 224 is rotatably connected to one inner rotation groove 221*a*.

It may be understood that the inner-side hub 221 may be connected to the omni wheel primary structure 222 in other fashions, for example, welding connection, snap-fitting connection, or the like, other than the above described fashion. In addition, the inner-side hub 221 and the omni wheel primary structure 222 may collaboratively define the inner rotation groove 221*a* in other fashions other than the above described fashion, and the inner-side roller 224 may be rotatably connected to the inner rotation groove 221 in other fashions other than the above described fashion, which are not described herein any further.

With respect to the outer-side hub 223, as illustrated in FIG. 7 to FIG. 9, the outer-side hub 223 includes an outer-side hub body 2231 and a plurality of second outer bosses 2232 that are defined by extending from the outer-side hub body 2231. The plurality of second outer bosses 2232 are disposed around the outer-side hub body 2231, and a second outer groove 2232*a* is defined by two adjacent outer bosses 2232. The number of first outer bosses 2222 is the same as the number of second outer bosses 2232, and one first outer boss 2222 is threaded to one second outer boss 2232, such that the outer-side hub 223 is connected to the omni wheel primary structure 222. In addition, when the first outer boss 2222 is threaded to the second outer boss 2232, one first outer groove 2222*a* is in communication with one second outer groove 2232*a*, such that an outer rotation groove 223*a* is collaboratively defined. One outer shaft pin 228 is disposed in one outer rotation groove 223*a*, and two ends of the outer shaft pin 228 are fixed to two opposing side walls of the outer rotation groove 223*a*, such that one outer-side roller 225 is rotatably connected to one outer rotation groove 223*a*.

It may be understood that the outer-side hub 223 may be connected to the omni wheel primary structure 222 in other fashions, for example, welding connection, snap-fitting connection, or the like, other than the above described fashion. The inner-side hub 221 and the omni wheel primary structure 222 may collaboratively define the inner rotation groove 221*a* in other fashions other than the above described fashion, and the inner-side roller 224 may be rotatably connected to the inner rotation groove 221 in other fashions other than the above described fashion, which are not described herein any further.

In some embodiments, as illustrated in FIG. 8 and FIG. 9, the omni wheel 22 may further include an inner gasket 2210 and an outer gasket 220. The inner gasket 2210 is sleeved onto the inner shaft pin 229, and the inner gasket 2210 is disposed between the third bearing 227 and the side wall of the inner rotation groove 221*a*, and configured to stop the third bearing 227 to prevent the third bearing 227 from detaching from the inner shaft pin 229. The outer gasket 220 is sleeved onto the outer shaft pin 228, and the outer gasket 220 is disposed between the second bearing 226 and the side wall of the outer rotation groove 223*a*, and configured to stop the second bearing 226 to prevent the second bearing 226 from detaching from the outer shaft pin 228.

Figure 10:
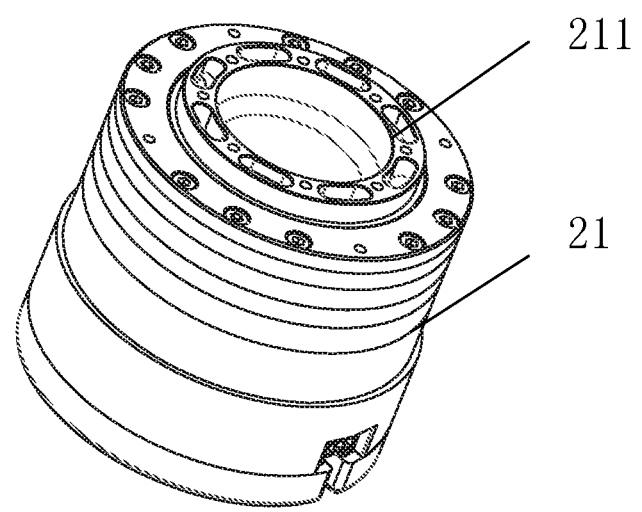
FIG. 10 is a schematic view of an effector according to an embodiment of the present application.

With respect to the effector 21, as illustrated in FIG. 10 and FIG. 3, the effector 21 is inserted into the shaft groove 2221*a* from the connecting through hole 2211*a* of the inner-side hub 221, and sleeved onto the first bearing 23 in the shaft groove 2221*a*, and the output end of the effector 21 is connected to a surface of the outer-side hub 223 facing towards the shaft groove 2221*a*. When the output end of the effector 21 rotates, the output end of the effector 21 drives the omni wheel 22 to rotate. In some embodiments, the effector 21 may be an outer rotor effector, and the output end of the effector 21 may be a flange 211, such that the effector 21 outputs a greater torque.

It may be understood that the flange 211 may also be connected to the outer-side hub 223 by flange threading or welding or the like.

In some embodiments, the caster module may not include the first bearing 23, a gap is defined between the omni wheel primary structure 222 and the case of the effector 21, and the omni wheel primary structure 222 may be rotatable relative to the case of the effector 21.

For readers' better understanding of the inventive concept of the present application, an assembling process of the caster module 20 is described as follows: fixing the inner ring of the first bearing 23 to the case of the effector 21; threading the effector 21 to the outer-side hub 223; fixing the outer shaft pin 228 to the inner ring of the second bearing 226; fixing the outer ring of the second bearing 226 to the outer through hole 2251 of the outer-side roller 225; sleeving the outer gasket 220 onto the outer shaft pin 228; threading the omni wheel primary structure 222 to the outer-side hub 223; fixing the inner shaft pin 229 to the inner ring of the third bearing 227; fixing the outer ring of the third bearing 227 to the inner through hole 2241 of the inner-side roller 224; sleeving the gasket 2210 onto the inner shaft pin 229; and threading the omni wheel primary structure 222 to the inner-side hub 221.

It may be understood that the assembling fashion of the caster module 20 is not limited to the above described assembling process. Other assembling fashions may also apply to the caster module, which are not described herein any further.

For readers' better understanding of the inventive concept of the present application, hereinafter, a movement process of the caster module 20 is described as follows:

First, the effector 21 drives the flange 211 to rotate, the flange 211 hence drives the outer-side hub 223 to rotate, the outer-side hub 223 then drives the omni wheel primary structure 222 to rotate, and finally the omni wheel primary structure 222 drives the inner-side hub 221 to rotate.

In the embodiments of the present application, the effector 21 is received in the shaft groove 2221*a* of the omni wheel 22, and the case of the effector 21 is rotatable relative to the inner wall of the shaft groove 2221*a*; in the meantime, the flange 211 of the effector 21 is fixed to the omni wheel 22, and when the effector 21 drives the flange 211 to rotate, the omni wheel 22 may rotate relative to the effector 21, such that the effector 21 is integrated in the omni wheel 22. As compared with the configuration where the effector 21 is separated from the omni wheel 22, and the effector 21 and the omni wheel 22 both occupy a space, the caster module 20 according to the embodiments occupies a smaller space, and achieves a higher integration degree, such that the robot becomes lighter.

An embodiment of the present application further provides a robot. The robot includes a caster module. The caster module has the same structure and functionality as the caster module according to the above embodiment. For details of the structure and functionality of the caster module, reference may be made to the above embodiment, which is not described herein any further.

It should be finally noted that the above-described embodiments are merely for illustration of the present application, but are not intended to limit the present application. Although the present invention is described in detail with reference to these embodiments, a person skilled in the art may also make various modifications to the technical solutions disclosed in the embodiments, or make equivalent replacements to a part of or all technical features contained therein. Such modifications or replacement, made without departing from the principles of the present application, shall fall within the scope defined by the claims and the specification of the present application. Especially, various technical features mentioned in various embodiments may be combined in any fashion as long as there is no structural conflict. The present application is not limited to the specific embodiments described herein in this specification, but also includes all the technical solutions falling within the scope subject to the appended claims.

What is claimed is:

1. A caster module, comprising:
   an omni wheel provided with a shaft groove; and
   an effector received in the shaft groove, a case of the effector being rotatable relative to an inner wall of the shaft groove, and an output end of the effector being connected to the omni wheel and configured to drive the omni wheel to rotate;
   wherein the omni wheel comprises an inner-side hub, an omni wheel primary structure, an outer-side hub, an inner-side roller, and an outer-side roller; wherein
   the shaft groove is disposed on the omni wheel primary structure, the inner-side hub and the outer-side hub are both connected to the omni wheel primary structure, the inner-side hub and the outer-side hub are respectively disposed at two ends of the shaft groove, the inner-side hub and the omni wheel primary structure collaboratively define an inner rotation groove, the inner-side roller being rotatably connected to the inner rotation groove, and the outer-side hub and the omni wheel primary structure collaboratively define an outer rotation groove, the outer-side roller being rotatably connected to the outer rotation groove; and
   the inner-side hub is provided with a connecting through hole in communication with the shaft groove, the effector is inserted into the shaft groove by the connecting through hole, and the output end of the effector is connected to a surface of the outer-side hub facing towards the shaft groove;
   wherein the effector is an outer rotor effector, the output end of the effector is a flange;
   the effector drives the flange to rotate, the flange hence drives the outer-side hub to rotate, the outer-side hub then drives the omni wheel primary structure to rotate, and finally the omni wheel primary structure drives the inner-side hub to rotate.

2. The caster module according to claim 1, further comprising a first bearing, the first bearing being disposed in the shaft groove, an outer ring of the first bearing being fixed to the inner wall of the shaft groove, the case of the effector being sleeved onto the first bearing, and the case of the effector being fixed to an inner ring of the first bearing.

3. The caster module according to claim 1, wherein the inner-side hub is threaded to the omni wheel primary structure, and the outer-side hub is threaded to the omni wheel primary structure.

4. The caster module according to claim 1, wherein the omni wheel further comprises a second bearing and an outer shaft pin; wherein
   the outer-side roller is provided with an outer through hole, the second bearing is fixed to the outer through hole; the outer shaft pin is inserted into the outer through hole and sleeved onto the second bearing, and two ends of the outer shaft pin are respectively fixed to two opposing side walls of the outer rotation groove.

5. The caster module according to claim 4, wherein the omni wheel further comprises an outer gasket, the outer gasket being sleeved onto one end of the outer shaft pin, and the outer gasket being disposed between the second bearing and a side wall of the outer rotation groove.

6. The caster module according to claim 1, wherein the omni wheel further comprises a third bearing and an inner shaft pin; wherein
   the inner-side roller is provided with an inner through hole, the third bearing is fixed to the inner through hole; the inner shaft pin is inserted into the inner through hole and sleeved onto the third bearing, and two ends of the inner shaft pin are respectively fixed to two opposing side walls of the inner rotation groove.

7. The caster module according to claim 6, wherein the omni wheel further comprises an inner gasket, the inner gasket being sleeved onto one end of the inner shaft pin, and the inner gasket being disposed between the third bearing and a side wall of the inner rotation groove.

8. A robot, comprising a caster module; the caster module comprising:
   an omni wheel provided with a shaft groove; and
   an effector received in the shaft groove, a case of the effector being rotatable relative to an inner wall of the shaft groove, and an output end of the effector being connected to the omni wheel and configured to drive the omni wheel to rotate;
   wherein the omni wheel comprises an inner-side hub, an omni wheel primary structure, an outer-side hub, an inner-side roller, and an outer-side roller; wherein
   the shaft groove is disposed on the omni wheel primary structure, the inner-side hub and the outer-side hub are both connected to the omni wheel primary structure, the inner-side hub and the outer-side hub are respectively disposed at two ends of the shaft groove, the inner-side hub and the omni wheel primary structure collaboratively define an inner rotation groove, the inner-side roller being rotatably connected to the inner rotation groove, and the outer-side hub and the omni wheel primary structure collaboratively define an outer rotation groove, the outer-side roller being rotatably connected to the outer rotation groove; and
   the inner-side hub is provided with a connecting through hole in communication with the shaft groove, the effector is inserted into the shaft groove by the connecting through hole, and the output end of the effector is connected to a surface of the outer-side hub facing towards the shaft groove;
   wherein the effector is an outer rotor effector, the output end of the effector is a flange;
   the effector drives the flange to rotate, the flange hence drives the outer-side hub to rotate, the outer-side hub then drives the omni wheel primary structure to rotate, and finally the omni wheel primary structure drives the inner-side hub to rotate.

9. The robot according to claim 8, the caster module further comprising a first bearing, the first bearing being disposed in the shaft groove, an outer ring of the first bearing being fixed to the inner wall of the shaft groove, the case of the effector being sleeved onto the first bearing, and the case of the effector being fixed to an inner ring of the first bearing.

10. The robot according to claim 8, wherein the inner-side hub is threaded to the omni wheel primary structure, and the outer-side hub is threaded to the omni wheel primary structure.

11. The robot according to claim 8, wherein the omni wheel further comprises a second bearing and an outer shaft pin; wherein
the outer-side roller is provided with an outer through hole, the second bearing is fixed to the outer through hole; the outer shaft pin is inserted into the outer through hole and sleeved onto the second bearing, and two ends of the outer shaft pin are respectively fixed to two opposing side walls of the outer rotation groove.

12. The robot according to claim 11, wherein the omni wheel further comprises an outer gasket, the outer gasket being sleeved onto one end of the outer shaft pin, and the outer gasket being disposed between the second bearing and a side wall of the outer rotation groove.

13. The caster module according to claim 8, wherein the omni wheel further comprises a third bearing and an inner shaft pin; wherein
the inner-side roller is provided with an inner through hole, the third bearing is fixed to the inner through hole; the inner shaft pin is inserted into the inner through hole and sleeved onto the third bearing, and two ends of the inner shaft pin are respectively fixed to two opposing side walls of the inner rotation groove.

14. The robot according to claim 13, wherein the omni wheel further comprises an inner gasket, the inner gasket being sleeved onto one end of the inner shaft pin, and the inner gasket being disposed between the third bearing and a side wall of the inner rotation groove.

\* \* \* \* \*